United States Patent
Suh et al.

(10) Patent No.: US 11,850,572 B2
(45) Date of Patent: Dec. 26, 2023

(54) ACTIVATED CARBON CATALYST FOR HYDROGEN PEROXIDE DECOMPOSITION, METHOD FOR PRODUCING SAME, AND METHOD FOR DECOMPOSING HYDROGEN PEROXIDE BY USING SAME

(71) Applicant: KOREA RESEARCH INSTITUTE OF CHEMICAL TECHNOLOGY, Daejeon (KR)

(72) Inventors: Jeong Kwon Suh, Daejeon (KR); Ji Sook Hong, Daejeon (KR); Iljeong Heo, Daejeon (KR)

(73) Assignee: KOREA RESEARCH INSTITUTE OF CHEMICAL TECHNOLOGY, Daejeon (KR)

( * ) Notice: Subject to any disclaimer, the term of this patent is extended or adjusted under 35 U.S.C. 154(b) by 297 days.

(21) Appl. No.: 17/289,226

(22) PCT Filed: Oct. 31, 2019

(86) PCT No.: PCT/KR2019/014597
§ 371 (c)(1),
(2) Date: Apr. 27, 2021

(87) PCT Pub. No.: WO2020/091459
PCT Pub. Date: May 7, 2020

(65) Prior Publication Data
US 2021/0402375 A1 Dec. 30, 2021

(30) Foreign Application Priority Data

Nov. 2, 2018 (KR) .................. 10-2018-0133705

(51) Int. Cl.
*B01J 21/18* (2006.01)
*B01J 23/34* (2006.01)
(Continued)

(52) U.S. Cl.
CPC .............. *B01J 21/18* (2013.01); *B01J 23/34* (2013.01); *B01J 35/023* (2013.01); *B01J 35/08* (2013.01);
(Continued)

(58) Field of Classification Search
CPC . B01J 21/18; B01J 23/34; B01J 35/023; B01J 35/08; B01J 35/1028; B01J 37/0201; B01J 37/08; C01B 13/0214; C01B 15/01
(Continued)

(56) References Cited

U.S. PATENT DOCUMENTS 4,601,884 A * 7/1986 Coeckelberghs ... C01B 13/0214
422/212
5,262,314 A * 11/1993 Anton ...................... C12P 7/40
562/538
(Continued)

FOREIGN PATENT DOCUMENTS

CN 1055524 A * 10/1991 ............. C01B 13/02
JP 04088923 A * 3/1992 ............... A01G 1/00
(Continued)

OTHER PUBLICATIONS

English translation of Written Opinion for PCT/KR2019/014597, (Year: 2020).*
(Continued)

*Primary Examiner* — Patricia L. Hailey
(74) *Attorney, Agent, or Firm* — Leydig, Voit & Mayer, Ltd.

(57) ABSTRACT

Disclosed herein are an activated carbon catalyst for hydrogen peroxide decomposition, a preparation method thereof and a hydrogen peroxide decomposition method using the same. The activated carbon catalyst for hydrogen peroxide decomposition, provided in an aspect of the present invention may be easily prepared through the carbonization and
(Continued)

CARBONIZATION/ACTIVATION activation of an ion exchange resin, and safer and higher decomposition efficiency of hydrogen peroxide may be achieved than the conventional catalyst for hydrogen peroxide decomposition through the control of the manganese content and pore properties in the catalyst.

8 Claims, 8 Drawing Sheets

(51) Int. Cl.
*B01J 35/02* (2006.01)
*B01J 35/08* (2006.01)
*B01J 35/10* (2006.01)
*B01J 37/02* (2006.01)
*B01J 37/08* (2006.01)
*C01B 13/02* (2006.01)

(52) U.S. Cl.
CPC ....... *B01J 35/1028* (2013.01); *B01J 37/0201* (2013.01); *B01J 37/08* (2013.01); *C01B 13/0214* (2013.01)

(58) Field of Classification Search
USPC ............. 502/180, 182, 324; 423/445 R, 579, 423/648.1, 580.1, 644
See application file for complete search history.

(56) References Cited

U.S. PATENT DOCUMENTS

| | | | | |
|---|---|---|---|---|
| 5,488,023 | A * | 1/1996 | Gadkaree | B01J 37/084 502/410 |
| 6,184,177 | B1 * | 2/2001 | von Blucher | C01B 32/324 502/433 |
| 6,991,772 | B1 * | 1/2006 | Rusek | C01B 13/0214 423/580.1 |
| 7,288,504 | B2 * | 10/2007 | Von Blucher | B01J 20/28019 502/437 |
| 11,028,675 | B2 * | 6/2021 | Rusek | C09K 8/845 |

FOREIGN PATENT DOCUMENTS

| | | | | |
|---|---|---|---|---|
| JP | 2010-274169 | | 12/2010 | |
| JP | 2015-000374 | | 1/2015 | |
| KR | 20110115924 | A * | 10/2011 | ............. B01J 20/20 |
| KR | 10-2008-0083351 | | 7/2013 | |
| KR | 10-2013-0030314 | | 9/2014 | |
| KR | 10-2017-0085623 | | 12/2017 | |
| KR | 10-2018-0051250 | | 9/2019 | |
| WO | WO-2007027767 | A2 * | 3/2007 | ......... B01J 19/0093 |

OTHER PUBLICATIONS

Search Report dated Feb. 7, 2020, corresponding to International Application No. PCT/KR2019/014597 (filed Oct. 31, 2019), a related application, 5 pp.

\* cited by examiner

[Figure 1]
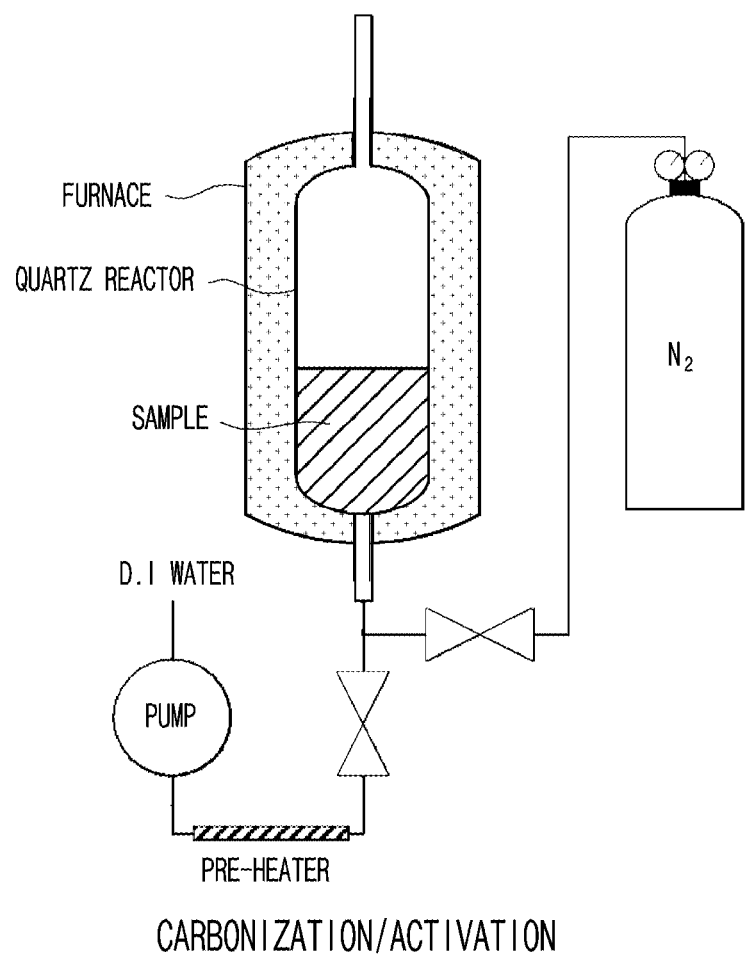

[Figure 2]
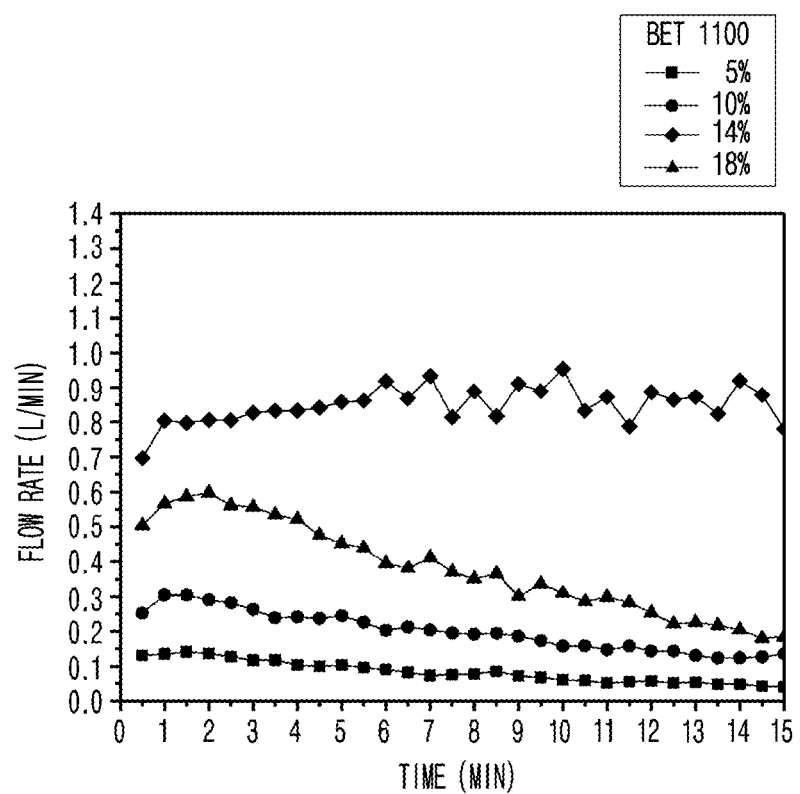

[Figure 3]
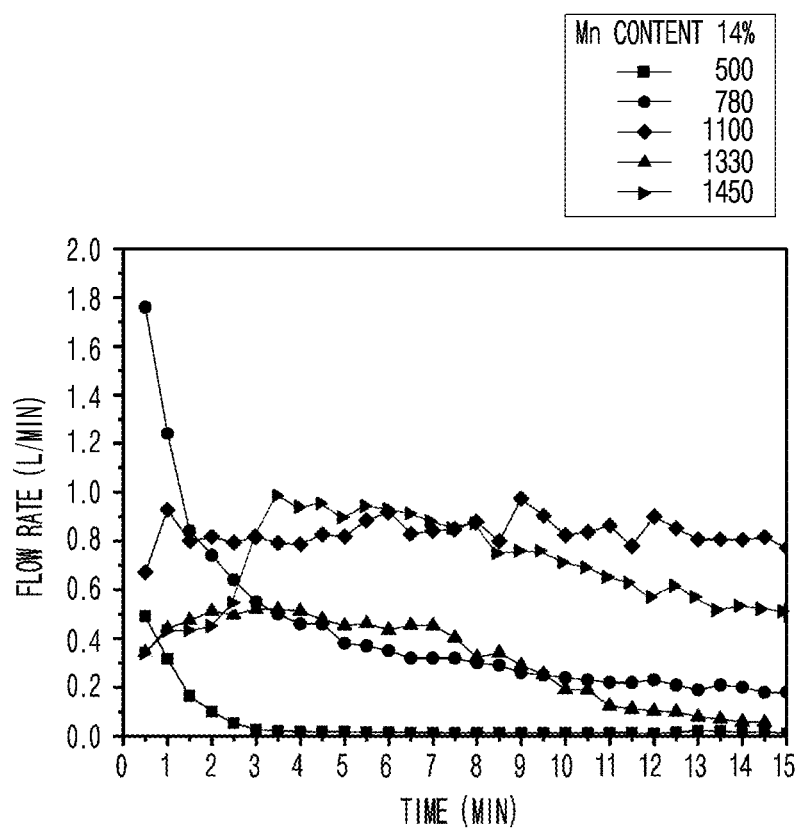

[Figure 4]
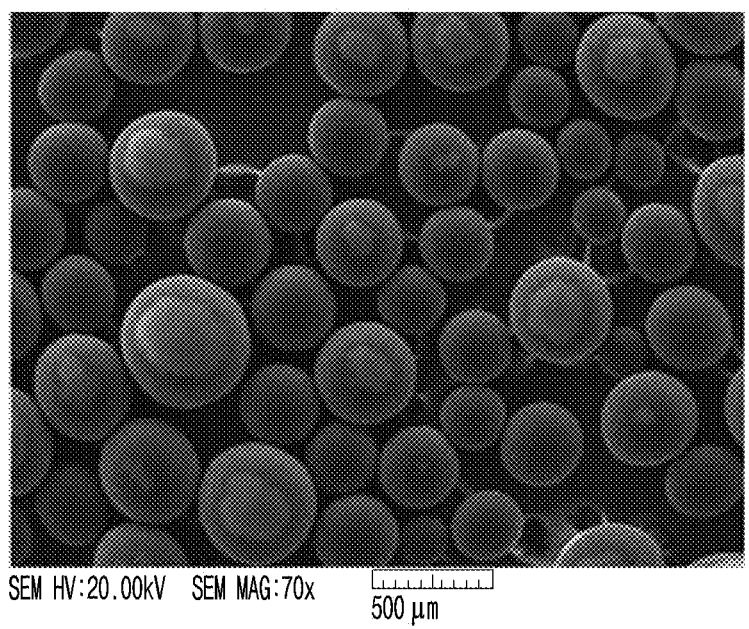

[Figure 5]
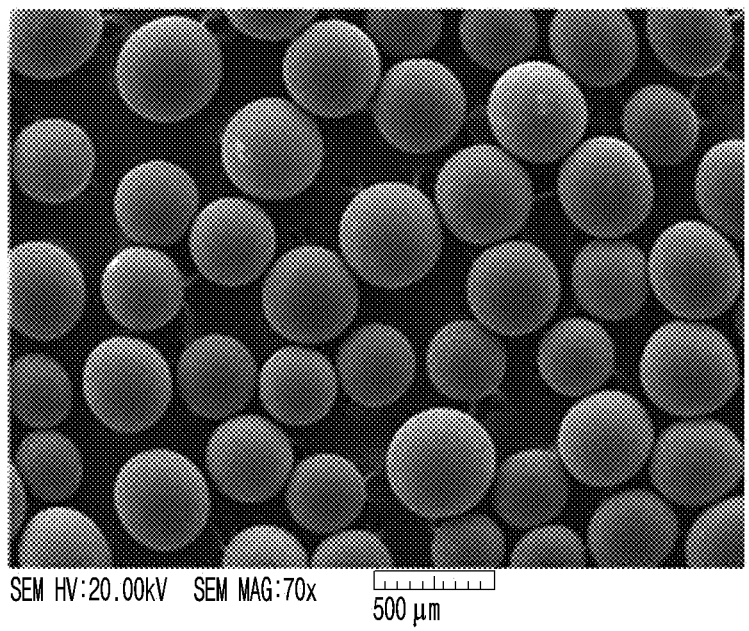

[Figure 6]
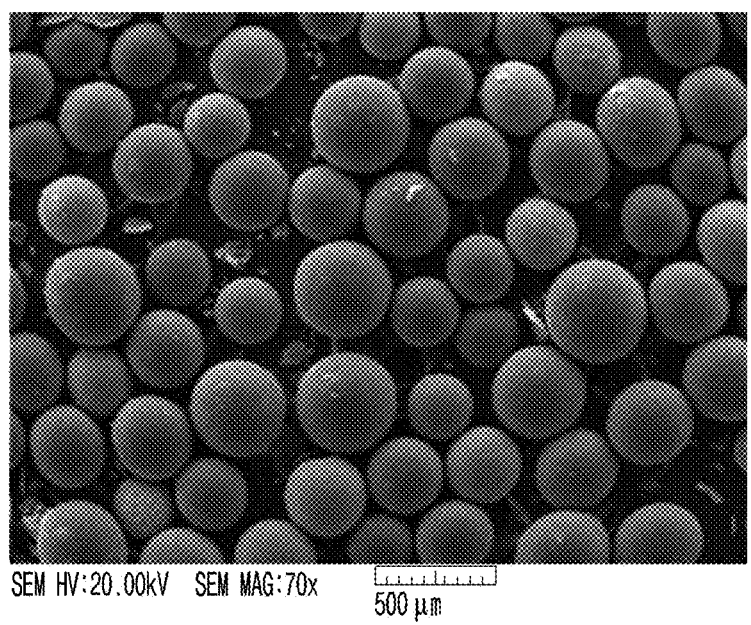

[Figure 7]
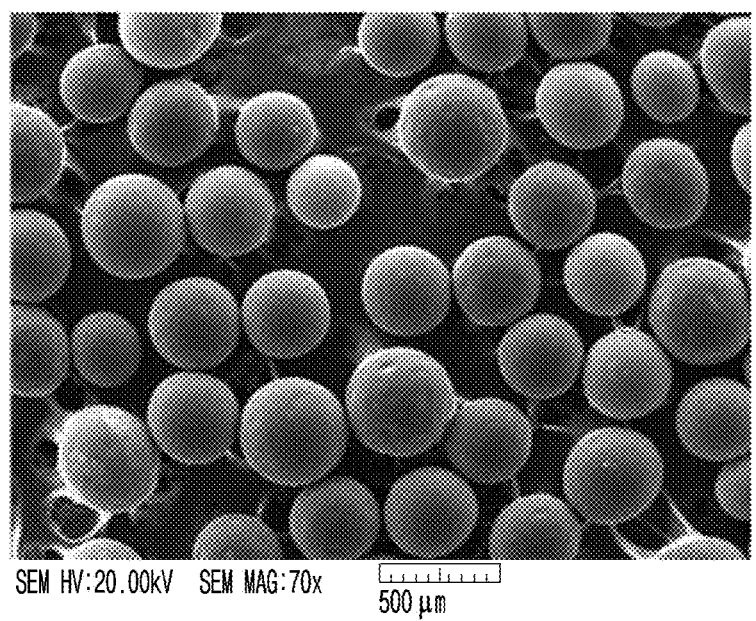

[Figure 8]
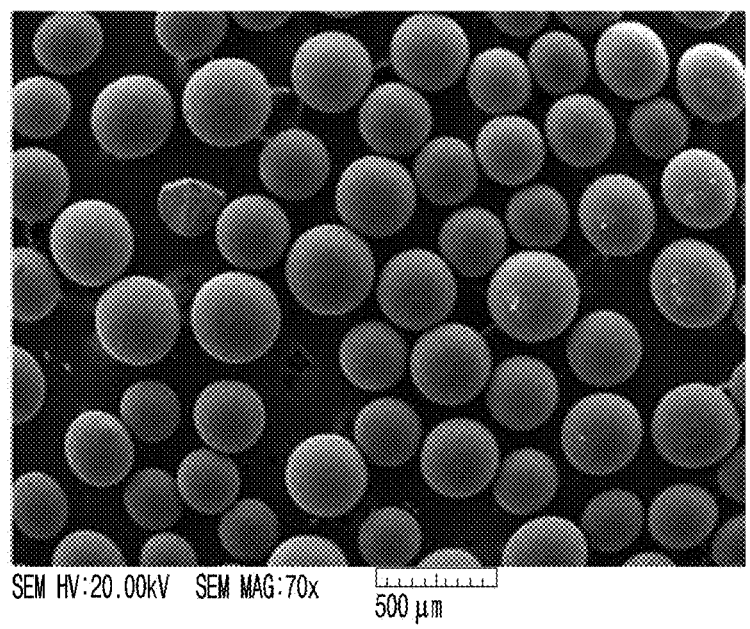

ACTIVATED CARBON CATALYST FOR HYDROGEN PEROXIDE DECOMPOSITION, METHOD FOR PRODUCING SAME, AND METHOD FOR DECOMPOSING HYDROGEN PEROXIDE BY USING SAME

CROSS-REFERENCE TO RELATED APPLICATIONS

This application is a U.S. National Stage Application filed under 35 U.S.C. § 371 of International Application No. PCT/KR2019/014597, filed Oct. 31, 2019, which claims the benefit of Korean Application No. KR 10-2018-0133705, filed Nov. 2, 2018. Both of these applications are hereby incorporated by reference in their entireties.

BACKGROUND OF THE INVENTION

1. Field of the Invention

The present disclosure relates to an activated carbon catalyst for hydrogen peroxide decomposition, a preparation method thereof and a hydrogen peroxide decomposition method using the same.

2. Description of the Related Art

Hydrogen peroxide is a compound wherein hydrogen and oxygen are combined, shows strong oxidizing power, and is utilized as an oxidizing agent, a bleach, a sterilizer and a source of oxygen. Hydrogen peroxide is commonly used in an aqueous solution state due to stability, and hydrogen peroxide on the market has a concentration of 30% to 35%. For the specific purposes of a rocket propellant, etc., hydrogen peroxide having a concentration of 90% or more may be used, but since there is a risk of explosion, attention is required. An aqueous phase of hydrogen peroxide with a low concentration is present in a stable state, but is decomposed by a catalyst as shown in Reaction 1 below to produce oxygen and water and emit heat.

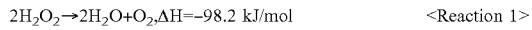

$$2H_2O_2 \rightarrow 2H_2O + O_2, \Delta H = -98.2 \text{ kJ/mol} \quad \text{<Reaction 1>}$$

There are diverse catalysts which cause the decomposition of hydrogen peroxide. Transition metals such as manganese (Mn), silver (Ag), platinum (Pt), and iron (Fe), alkali metals and compounds thereof, enzymes, organic materials, potassium iodide (KI), potassium permanganate ($KMnO_4$), sodium hypochlorite (NaOCl), etc., also cause the decomposition reaction of hydrogen peroxide. A manganese-based catalyst is known as a typical catalyst for decomposing hydrogen peroxide and mainly uses a manganese dioxide ($MnO_2$) type. By decomposing hydrogen peroxide using such a catalyst, oxygen of a high concentration may be obtained and may be utilized as the source of oxygen in a liquid fuel and an oxygen generating apparatus. In addition, radicals including HO· and HOO·, generated during the decomposition reaction of hydrogen peroxide may also be utilized in a process for oxidizing and removing contamination sources present in an aqueous solution phase.

In case of generating oxygen or removing contamination sources through the decomposition reaction of hydrogen peroxide, the amount of hydrogen peroxide and the performance of a catalyst influence the amount of oxygen and the reducing performance of the contamination sources. Since potassium permanganate ($KMnO_4$) which is a manganese-based catalyst, is present in a homogeneous state in an aqueous solution, fast decomposition reaction may be induced in a low-temperature region. However, since a catalyst component is homogeneously dispersed in the aqueous solution after finishing the reaction, the recovery thereof is not easy, and thus, additional environmental problems may be induced. On the contrary, a solid-type catalyst is precipitated in an aqueous solution after the decomposition reaction of hydrogen peroxide, and there are advantages in that layer separation is possible, the recovery thereof is easy, and the reuse of the catalyst is possible. However, since the solid-type catalyst is present in a heterogeneous state in hydrogen peroxide and undergoes catalyst reaction, there are defects in that a decomposition reaction rate is slow (Korean Laid-open Patent No. 10-2013-0030314).

In addition, the conventional solid phase catalyst for hydrogen peroxide decomposition has a formulation of a powder type, and if comes in contact with hydrogen peroxide, explosive reaction may arise temporarily, and the control of the amount of oxygen produced may be difficult. Such defects stood out as shortcomings of unsuccessful commercialization in practice, because in a system for supplying oxygen necessary in an emergency disaster including fire, oxygen is required to be emitted in a constant rate for a constant time.

SUMMARY OF THE INVENTION

An object in an aspect of the present invention is to provide an activated carbon catalyst for hydrogen peroxide decomposition, which may be easily prepared through carbonization and activation of an ion exchange resin, and may accomplish safer and higher decomposition efficiency of hydrogen peroxide when compared to the conventional catalyst for hydrogen peroxide decomposition, through controlling the manganese content and pore properties in a catalyst.

An object in another aspect of the present invention is to provide a preparation method of the activated carbon catalyst for hydrogen peroxide decomposition.

An object in still another aspect of the present invention is to provide an apparatus for hydrogen peroxide decomposition, including the activated carbon catalyst for hydrogen peroxide decomposition.

An object in even another aspect of the present invention is to provide a decomposition method of hydrogen peroxide, using the activated carbon catalyst for hydrogen peroxide decomposition.

In order to achieve the objects, an aspect of the present invention provides an activated carbon catalyst containing manganese for hydrogen peroxide decomposition, wherein the activated carbon catalyst for hydrogen peroxide decomposition is characterized in being formed from an ion exchange resin.

In addition, another aspect of the present invention provides a preparation method of an activated carbon catalyst for hydrogen peroxide decomposition, including: immersing an ion exchange resin in a manganate (II) solution to perform ion exchange so that manganese is contained in the ion exchange resin;

drying the ion exchanged ion exchange resin; and heating the dried ion exchange resin for carbonization and activation.

Furthermore, a still another aspect of the present invention provides an apparatus for hydrogen peroxide decomposition, including the activated carbon catalyst for hydrogen peroxide decomposition.

In addition, an even another aspect of the present invention provides a decomposition method of hydrogen peroxide, including: immersing the activated carbon catalyst for hydrogen peroxide decomposition in hydrogen peroxide to decompose the hydrogen peroxide into water and oxygen; and recovering a remaining catalyst.

The activated carbon catalyst for hydrogen peroxide decomposition provided in one aspect of the present invention may be easily prepared through the carbonization and activation of an ion exchange resin, and through the control the content of manganese in the catalyst and pore properties, effects of safer and higher decomposition efficiency of hydrogen peroxide could be achieved than the conventional catalyst for hydrogen peroxide decomposition.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a diagram showing a reaction apparatus used in a step of carbonization and activation during preparing an activated carbon catalyst for hydrogen peroxide decomposition, provided in an aspect of the present invention.

FIG. 2 is a diagram showing comparison results on the decomposition efficiency of hydrogen peroxide in accordance with diverse manganese contents in a catalyst.

FIG. 3 is a diagram showing comparison results on the decomposition efficiency of hydrogen peroxide in accordance with diverse specific surface areas in a catalyst.

FIG. 4 is a diagram showing spherical activated carbon (70×) which do not carry a metal.

FIG. 5 is a diagram showing Example 1-1 (70×).

FIG. 6 is a diagram showing Example 1-4 (70×).

FIG. 7 is a diagram showing Example 1-5 (70×).

FIG. 8 is a diagram showing Example 1-9 (70×).

DESCRIPTION OF THE PREFERRED EMBODIMENTS

Hereinafter, the present invention will be explained in detail.

Meanwhile, the embodiments of the present invention could be modified into various other types, and the scope of the present invention is not limited to embodiments explained below. In addition, the embodiments of the present invention are provided for explaining the present invention more completely to a person having average knowledge in this technical field. Further, "comprising" a certain constituent element throughout the specification means the further inclusion of other constituent elements but does not preclude the other constituent elements unless otherwise described to the contrary.

An aspect of the present invention provides an activated carbon catalyst containing manganese for hydrogen peroxide decomposition, wherein the activated carbon catalyst for hydrogen peroxide decomposition is characterized in being formed from an ion exchange resin.

In this case, the manganese may be included in a range of 12 to 16 wt %, may be included in a range of 13 to 16 wt %, may be included in a range of 14 to 16 wt %, may be included in a range of 12 to 15 wt %, may be included in a range of 12 to 14 wt %, may be included in a range of 13 to 15 wt %, or may be included in a range of 14 wt %, in 100 wt % of the activated carbon catalyst for hydrogen peroxide decomposition, but the manganese content is not limited to a specific value.

In addition, the specific surface area of the activated carbon catalyst for hydrogen peroxide decomposition may be in a range of 1000 to 1200 $m^2/g$, in a range of 1020 to 1200 $m^2/g$, in a range of 1040 to 1200 $m^2/g$, in a range of 1060 to 1200 $m^2/g$, in a range of 1080 to 1200 $m^2/g$, in a range of 1100 to 1200 $m^2/g$, in a range of 1000 to 1180 $m^2/g$, in a range of 1000 to 1160 $m^2/g$, in a range of 1000 to 1140 $m^2/g$, in a range of 1000 to 1120 $m^2/g$, in a range of 1000 to 1100 $m^2/g$, in a range of 1020 to 1180 $m^2/g$, in a range of 1040 to 1160 $m^2/g$, in a range of 1060 to 1140 $m^2/g$, in a range of 1080 to 1120 $m^2/g$, in a range of 1100 $m^2/g$, but the specific surface area is not limited to a specific value.

The activated carbon catalyst for hydrogen peroxide decomposition may be prepared by the carbonization and activation of an ion exchange resin which is ion exchanged and includes manganese. In addition, the activated carbon catalyst for hydrogen peroxide decomposition may have a spherical shape, and the activated carbon catalyst for hydrogen peroxide decomposition with a spherical shape may have an average diameter in a range of 0.1 to 5.0 mm, in a range of 0.2 to 5.0 mm, in a range of 0.3 to 5.0 mm, in a range of 0.1 to 4.0 mm, in a range of 0.1 to 3.0 mm, in a range of 0.1 to 2.0 mm, in a range of 0.1 to 1.0 mm, in a range of 0.1 to 5.0 mm, in a range of 0.1 to 1.0 mm, in a range of 0.1 to 0.5 mm, in a range of 0.1 to 0.3 mm, in a range of 0.2 to 1.0 mm, and in a range of 0.3 to 0.5 mm, but the average diameter is not limited to a specific value.

In another aspect of the present invention, there is provided a preparation method of an activated carbon catalyst for hydrogen peroxide decomposition, including:

immersing an ion exchange resin in a manganate (II) solution to perform ion exchange so that manganese is contained in the ion exchange resin;

drying the ion exchanged ion exchange resin; and heating the dried ion exchange resin for carbonization and activation.

In this case, the manganate (II) may use manganese nitrate, manganese acetate, manganese chloride, manganese acetylacetonate, manganese bromide, manganese carbonate, manganese fluoride, manganese iodide, manganese sulfate, etc. solely, or combinations thereof, without specific limitation.

The drying may be performed at 50 to 150° C., and the heating may be performed at 800 to 1100° C., without specific limitation.

Another aspect of the present invention provides a decomposition apparatus of hydrogen peroxide, including the activated carbon catalyst for hydrogen peroxide decomposition.

Further another aspect of the present invention provides a decomposition method of hydrogen peroxide, including:

immersing the activated carbon catalyst for hydrogen peroxide decomposition in hydrogen peroxide to decompose the hydrogen peroxide into water and oxygen; and recovering a remaining catalyst.

The activated carbon catalyst for hydrogen peroxide decomposition, provided in an aspect of the present invention may be easily prepared through the carbonization and activation of an ion exchange resin, and through the control of the manganese content and pore properties in the catalyst, effects of accomplishing safer and higher decomposition efficiency of hydrogen peroxide than the conventional catalyst for hydrogen peroxide decomposition may be obtained, and these may be directly supported by Examples and Experimental Examples, described below.

<Example 1> Preparation of Activated Carbon Catalyst for Hydrogen Peroxide Decomposition The activated carbon catalyst for hydrogen peroxide decomposition, provided in an aspect of the present invention was prepared as follows.

Into an aqueous solution including $Mn(NO_3)_2$, an ion exchange resin (gel type strongly acidic cation resin with a product name of AMBERLITE™ IRC 120 H Ion Exchange Resin, purchased from Dow Chemical Co.) was immersed to induce ion exchange. Hence, an ion exchange resin carrying manganese was obtained, and this was dried at 100° C. for one day. Then, heating at 900° C. was performed under a nitrogen ($N_2$) atmosphere for the carbonization and activation of the ion exchange resin to prepare an activated carbon catalyst for hydrogen peroxide decomposition. A reaction apparatus used for preparing the activated carbon catalyst for hydrogen peroxide decomposition is shown in FIG. 1.

The manganese content (wt %) and specific surface area ($m^2/g$) in the catalyst were controlled by controlling the concentration of an aqueous solution including $Mn(NO_3)_2$ (i.e., a precursor solution), and time for carbonization and activation, and the results are shown in Table 1 and Table 2 below.

<Experimental Example 1> Evaluation on Decomposition Efficiency of Hydrogen Peroxide According to Manganese Content The decomposition efficiency of hydrogen peroxide according to the manganese content in the activated carbon catalyst for hydrogen peroxide decomposition, provided in an aspect of the present invention, was evaluated as follows.

0.05 g of each of the activated carbon catalysts prepared in Examples 1-1 to 1-4 and 200 cc of a 30% (v/v) hydrogen peroxide solution were reacted. The reaction was conducted in a glass reactor with a volume of 500 ml. 200 cc of the 30% (v/v) hydrogen peroxide solution was charged in the reactor, and 0.05 g of the activated carbon catalyst prepared was put in a catalyst container. In a closed state of the reactor, the container was dropped into the hydrogen peroxide solution to initiate the reaction. An oxygen gas produced through the reaction was passed through a vapor trap to remove vapor, and then, passed through a mass flow meter, and a flow rate was measured every 30 seconds.

The results are shown in FIG. 2.

As shown in FIG. 2, the catalyst of Example 1-3, including 14 wt % of manganese in total 100 wt % of the catalyst showed most excellent decomposition efficiency of hydro-

TABLE 1

| Example | Mn content (wt %) | BET specific surface area ($m^2/g$) | $PV_{meso}$ ($cm^3/g$)* | $PV_{micro}$ ($cm^3/g$)* | Concentration of precursor solution used during preparing catalyst and activation time |
|---|---|---|---|---|---|
| 1-1 | 5% | 1124 | 0.36 (51%) | 0.34 (49%) | 0.1 N, 5 h |
| 1-2 | 10% | 1122 | 0.32 (48%) | 0.34 (52%) | 0.2 N, 5 h |
| 1-3 | 14% | 1116 | 0.81 (75%) | 0.27 (25%) | 0.3 N, 5.5 h |
| 1-4 | 18% | 1118 | 0.87 (76%) | 0.27 (24%) | 0.3 N, 6.5 h |

TABLE 2

| Example | Mn content (wt %) | BET specific surface area ($m^2/g$) | $PV_{meso}$ ($cm^3/g$)* | $PV_{micro}$ ($cm^3/g$)* | Concentration of precursor solution used during preparing catalyst and activation time |
|---|---|---|---|---|---|
| 1-5 | 14% | 500 | 0.12 (43%) | 0.16 (57%) | 1 N, 1.5 h |
| 1-6 | 14% | 780 | 0.39 (63%) | 0.23 (37%) | 0.5 N, 3.5 h |
| 1-7 | 14% | 1100 | 0.81 (75%) | 0.27 (25%) | 0.3 N, 5.5 h |
| 1-8 | 14% | 1330 | 0.83 (80%) | 0.21 (20%) | 0.2 N, 8 h |
| 1-9 | 14% | 1450 | 0.95 (86%) | 0.16 (14%) | 0.18 N, 7 h |

*The values in parentheses are percent values with respect to total pore volume ($PV_{meso} + PV_{micro}$)

gen peroxide. From this, the catalyst including 14 wt % of manganese may induce an oxygen generation profile most consistently.

<Experimental Example 2> Evaluation on Decomposition Efficiency of Hydrogen Peroxide According to Pore Properties In order to evaluate the decomposition efficiency of hydrogen peroxide according to pore properties in the activated carbon catalyst for hydrogen peroxide decomposition, provided in an aspect of the present invention, the decomposition efficiency of hydrogen peroxide was evaluated by the same method as in Experimental Example 1 using the activated carbon catalysts prepared in Examples 1-5 to 1-9.

The results are shown in FIG. 3.

As shown in FIG. 3, the activated carbon catalysts having a specific surface area of 1000 $m^2/g$ or less, showed a rapid reaction rate at an initiation stage, and then showed a rapidly reduced production flow rate of oxygen of 0.5 L/min. For reasons, for favorable reaction in an aqueous phase, the development of pores with a meso size is important, but in case of the catalysts, a total pore volume was small, and in addition, the percent of a meso pore volume was less than 70% and insufficient, a reaction solution (hydrogen peroxide) could not easily diffuse into the pores but made a contact with only the active site at the surface of the activated carbon, and thus, it is judged that the reaction activity was shown at an initiation stage. However, in case of activated carbon catalysts having a specific surface area of 1000 $m^2/g$-1400 $m^2/g$, a production flow rate of oxygen tended to be kept relatively constant. These had the percent of meso pore volume of 70%-80%, and meso pores were sufficiently formed so that a reaction solution could easily diffuse into the pores, and a gas (oxygen) could be easily exhausted for smooth exchange of the reactants and products. On the contrary, in case of a catalyst having a specific surface area of 1450 $m^2/g$, the results of lower activity than a catalyst with 1330 $m^2/g$ were shown. It could be found that these results were shown by the collapse of the pores through the over activation of the specimen with 1450 $m^2/g$. Accordingly, it could be found that the performance of an activated carbon catalyst is closely related to pore properties including a pore volume formed, forming ratio of meso and micro pores, etc.

INDUSTRIAL APPLICABILITY

The activated carbon catalyst for hydrogen peroxide decomposition, provided in an aspect of the present invention may be easily prepared through the carbonization and activation of an ion exchange resin, and safer and higher decomposition efficiency of hydrogen peroxide than the conventional catalyst for hydrogen peroxide decomposition may be achieved through the control of the manganese content and pore properties in the catalyst.

What is claimed is:

1. A method for the decomposition of hydrogen peroxide, the method comprising the steps of:
    a) immersing an ion exchange resin in a manganate (II) solution;
    b) performing ion exchange thereby transporting manganese from the manganate (II) solution to the immersed ion exchange resin, thereby forming an ion exchanged ion exchange resin;
    c) drying the ion exchanged ion exchange resin;
    d) heating the dried ion exchange resin to carbonize and activate the dried ion exchange resin, thereby forming an activated carbon catalyst;
    e) immersing the activated carbon catalyst in hydrogen peroxide thereby decomposing the hydrogen peroxide into water and oxygen; and
    f) recovering a remaining activated carbon catalyst.

2. The method of claim 1, wherein the manganese is present in the activated carbon catalyst in an amount of 12 to 16 wt % of the activated carbon catalyst.

3. The method of claim 1, wherein the activated carbon catalyst comprises a specific surface area in a range of 1000 to 1200 $m^2/g$.

4. The method of claim 1, wherein the activated carbon catalyst comprises a spherical shape.

5. The method of claim 1, wherein the activated carbon catalyst has an average diameter in a range of 0.1 to 5.0 mm.

6. The method of claim 1, wherein the manganate (II) solution comprises a manganese source selected from the group consisting of manganese nitrate, manganese acetate, manganese chloride, manganese acetylacetonate, manganese bromide, manganese carbonate, manganese fluoride, manganese iodide, manganese sulfate, and combinations thereof.

7. The method of claim 1, wherein step of c) is performed at 50 to 150° C.

8. The method of claim 1, wherein step of d) is performed at 800 to 1100° C.

* * * * *